US008548212B2

(12) United States Patent
You

(10) Patent No.: US 8,548,212 B2
(45) Date of Patent: Oct. 1, 2013

(54) FINGERPRINT RECOGNITION APPARATUS AND METHOD THEREOF

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 52 days.

(21) Appl. No.: 13/425,394

(22) Filed: Mar. 20, 2012

(65) Prior Publication Data

US 2013/0142403 A1 Jun. 6, 2013

(30) Foreign Application Priority Data

Dec. 6, 2011 (CN) .......................... 2011 1 0401169

(51) Int. Cl.
*G06K 9/00* (2006.01)

(52) U.S. Cl.
USPC ....................................... 382/124

(58) Field of Classification Search
USPC ....................................... 382/124
See application file for complete search history.

(56) References Cited

U.S. PATENT DOCUMENTS

| 3,560,928 A | * | 2/1971 | Kasem et al. | 382/124 |
| 6,876,757 B2 | * | 4/2005 | Yau et al. | 382/125 |
| 2010/0189316 A1 | * | 7/2010 | Walch | 382/125 |

OTHER PUBLICATIONS (D. Isenor, "Fingerprint Identification Using Graph Matching", 1986, Pattern Recognition, vol. 19, No. 2).*

* cited by examiner

*Primary Examiner* — Samir Ahmed
*Assistant Examiner* — Totam Le
(74) *Attorney, Agent, or Firm* — Altis & Wispro Law Group, Inc.

(57) ABSTRACT

The present invention provides a fingerprint recognition apparatus and a fingerprint recognition method adapted for the apparatus. The method includes steps of: performing an image processing function for fingerprints of a user and generating an image formed by a number of ridges; scanning the image according to a scanning frequency and selecting a number of scanning lines; acquiring a cross point formed between each ridge of fingerprint and each scanning line; acquiring a tangent line; generating a graph between each cross point and each corresponding slope value; determining whether the graph is similar to one of the stored at least one graph to obtain a determination result; and outputting a recognition result of the fingerprints of the user associated with the determination result.

10 Claims, 5 Drawing Sheets

FINGERPRINT RECOGNITION APPARATUS AND METHOD THEREOF

BACKGROUND

1. Technical Field

The disclosure relates to fingerprint recognition technology and, more particularly, to a fingerprint recognition apparatus and a fingerprint recognition method adapted for the fingerprint recognition apparatus.

2. Description of Related Art

A conventional fingerprint recognition method compares a current fingerprint image with a stored fingerprint image, if the two fingerprint images are similar to a certain degree, the current fingerprint is considered as a match, or if the two fingerprint images are not similar enough, the current fingerprint is not considered as a match. However, the conventional fingerprint recognition method is very complex and it is difficult to determine the similarity of the two fingerprint images.

Therefore, what is needed is a fingerprint recognition apparatus to overcome the described shortcoming.

DETAILED DESCRIPTION

Figure 1:
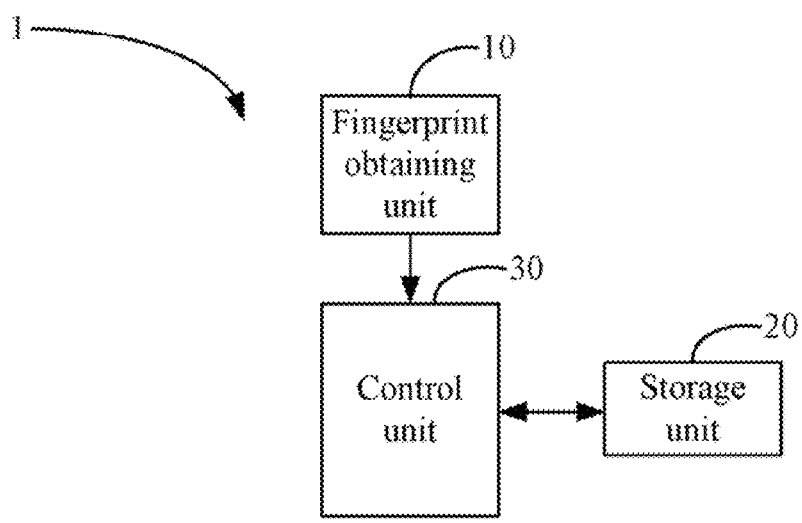
FIG. 1 is a block diagram of a fingerprint recognition apparatus in accordance with an exemplary embodiment.

FIG. 1 is a block diagram of a fingerprint recognition apparatus in accordance with an exemplary embodiment. The fingerprint recognition apparatus 1 includes a fingerprint obtaining unit 10, a storage unit 20, and a control unit 30. The fingerprint obtaining unit 10 obtains fingerprints of a user. The fingerprints of the user may be stored in the fingerprint recognition apparatus 1 or acquired from extensional storage devices (not shown), or captured by the fingerprint recognition apparatus 1. The storage unit 20 stores at least one graph of fingerprints. The control unit 30 controls the fingerprint recognition apparatus 1.

Figure 2:
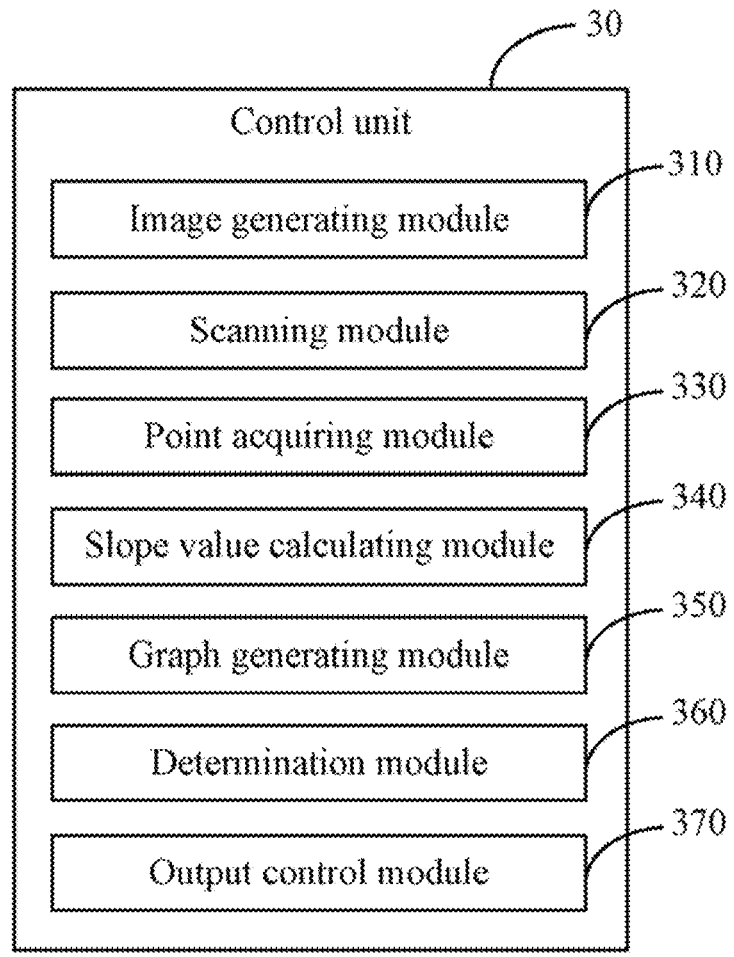
FIG. 2 is a block diagram of a control unit of the fingerprint recognition apparatus of FIG. 1.
Figure 3:
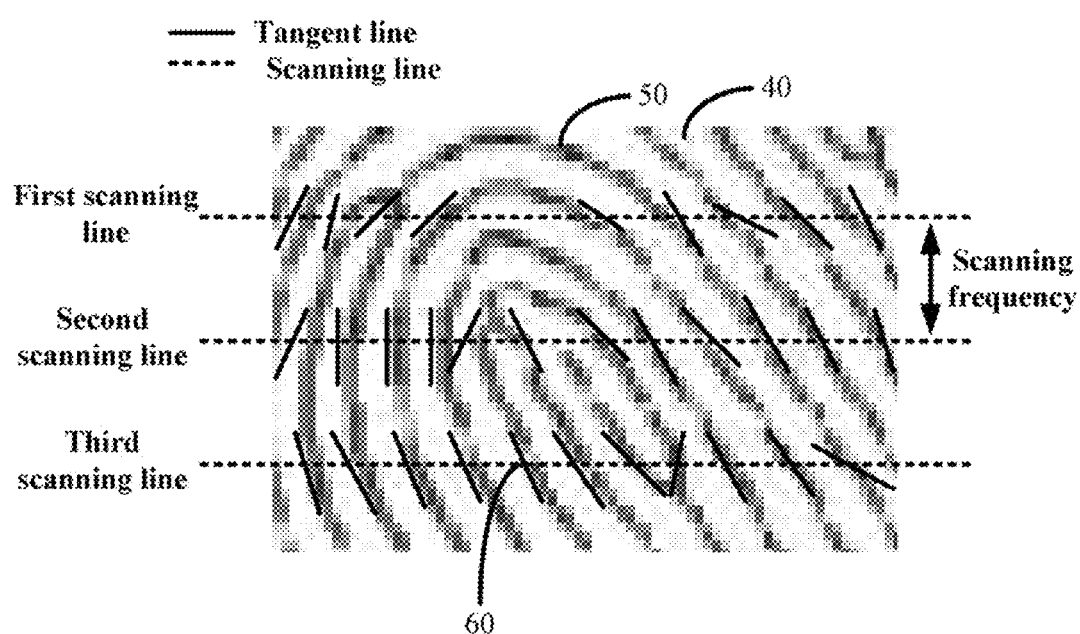
FIG. 3 is a schematic view of cross point analysis of the fingerprint recognition apparatus of FIG. 1.

As shown in FIG. 2, the control unit 30 includes an image generating module 310, a scanning module 320, a point acquiring module 330, a slope value calculating module 340, a graph generating module 350, a determination module 360, and an output control module 370. The image generating module 310 performs an image processing function for the obtained fingerprints and generates an image of the obtained fingerprints formed by a number of ridges which include three basic patterns, that is, the arch, loop, and whorl, for example, an image 40 of fingerprints shown in FIG. 3 is formed by a number of ridges 50. The scanning module 320 scans the image of the obtained fingerprints according to a scanning frequency and selects a number of scanning lines along a scanning direction. For example as shown in FIG. 3, the scanning module 320 scans the image 40 of the obtained fingerprints to select three scanning lines, e.g., a first scanning line, a second scanning line, and a third scanning line.

The point acquiring module 330 acquires a cross point formed between each ridge of fingerprint and each scanning line. For example, there are nine ridges on the first scanning line and nine cross points 60 are formed between the nine ridges and the first scanning line in FIG. 3. The slope value calculating module 340 acquires a tangent line which is tangent with one ridge of fingerprint 50 associated with each cross point 60 and calculates a slope value according to a gradient of the tangent line relative to the corresponding scanning line. In the embodiment, the slope value of each cross point is direct ratio to the gradient of the corresponding tangent line.

Figure 4:
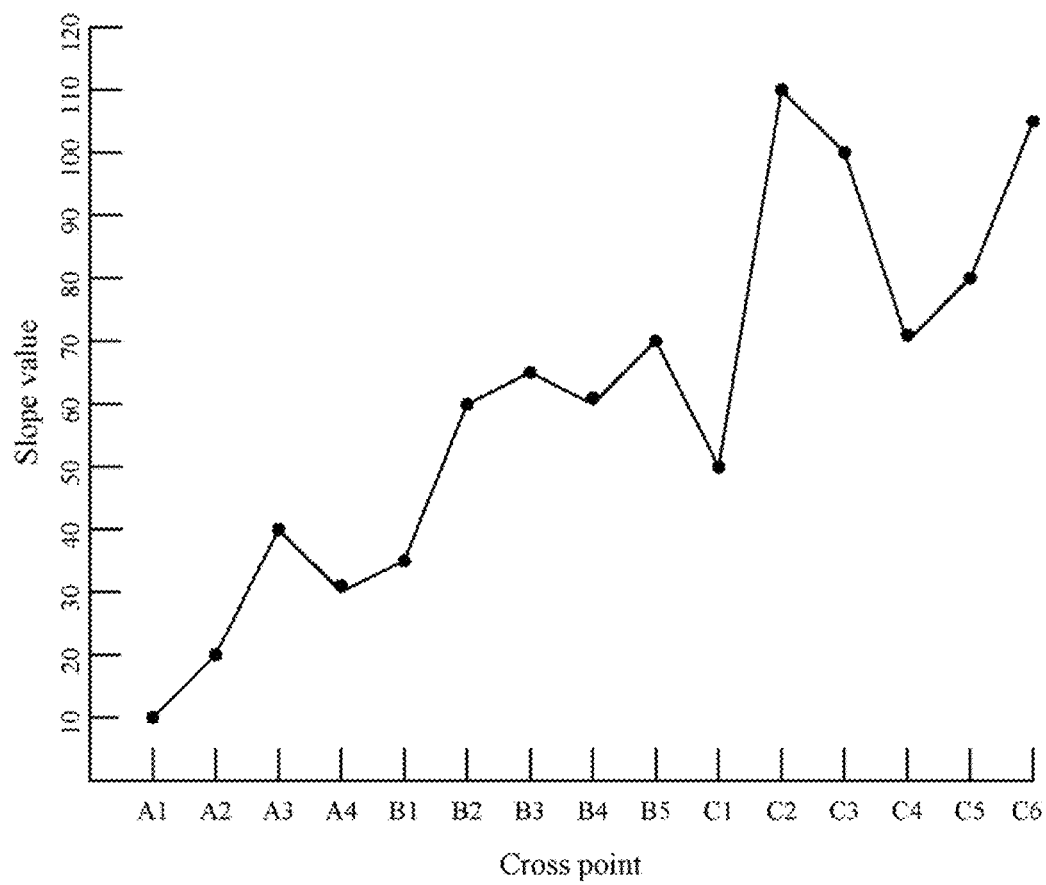
FIG. 4 is a graph between cross points and slope values of one user's fingerprints of the fingerprint recognition apparatus of FIG. 1.

The graph generating module 350 generates a graph between each cross point 60 and each corresponding slope value in a predetermined order of the cross points, and the graph is discrete. For example, as that shown in FIG. 4, an X axis of the graph represents cross points and a Y axis of the graph represents slope values. Typically, in the X axis, "A1-A4" represents cross points of the first scanning line, "B1-B5" represents cross points of the second scanning line, and "C1-C5" represents cross points of the third scanning line.

The determination module 360 determines whether the generated graph from the graph generating module 350 is similar to the at least one graph from the storage unit 20 to obtain a determination result. In detail, the determination module 360 determines whether the at least one graph from the storage unit 20 exists one which has the same number of cross points on each scanning line as the generated graph and created in the same order of cross points. When there is no graph which has the same number of cross points on each scanning line as the generated graph in the storage unit 20, the determination module 360 determines that the generated graph is not similar to the at least one graph from the storage unit 20.

When there is a graph which has the same number of cross points on each scanning line as the generated graph in the storage unit 20, the determination module 360 further determines whether a difference of two slope values associated with each cross point between the generated graph and the stored graph within a predetermined range and acquires the number of the differences of each two slope values within the predetermined range, and determines whether a percentage of the number of the differences of each two slope values within the predetermined range is greater than a predefined value. When the percentage of the number of the differences of each two slope values within the predetermined range is greater than the predefined value, the determination module 360 determines that the generated graph is similar to one of the at least one graph from the storage unit 20. When the percentage of the number of the differences of each two slope values within the predetermined range is less than the predefined value, the determination module 360 determines that the generated graph is not similar to the at least one graph from the storage unit 20.

The output control module 370 outputs a recognition result of the fingerprints of the user associated with the determination result from the determination module 360. When the determination module 360 determines that the generated graph is similar to one of the at least one graph from the storage unit 20, the output control module 370 outputs a passing recognition result of the fingerprints of the user. When the determination module 360 determines that the generated graph is not similar to the at least one graph from the storage unit, the output control module 370 outputs a failing recognition result of the fingerprints of the user.

Figure 5:
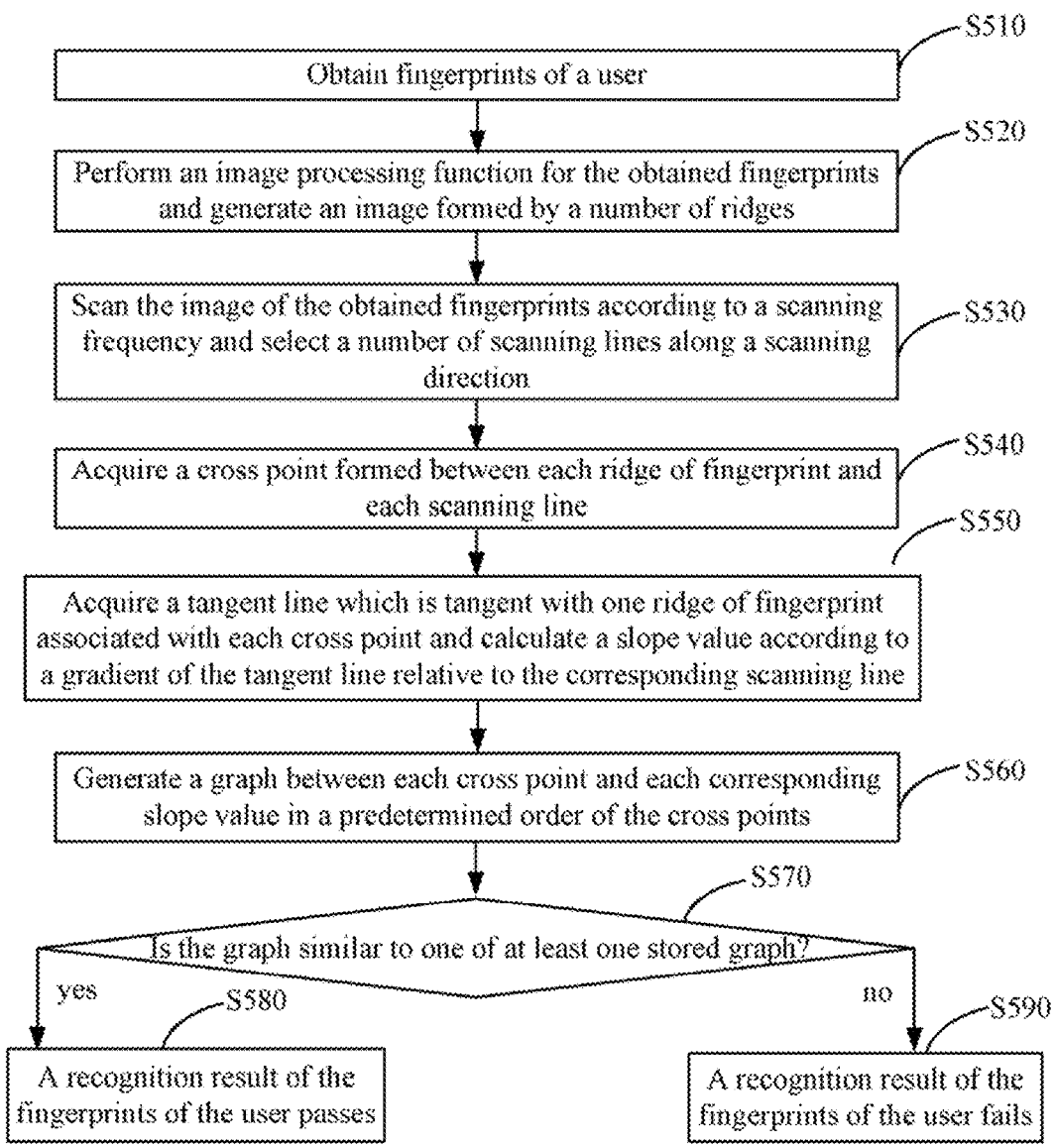
FIG. 5 is a flowchart of recognizing fingerprints method adapted for the fingerprint recognition apparatus of FIG. 1.

FIG. 5 is a flowchart of recognizing fingerprints method adapted for the fingerprint recognition apparatus of FIG. 1. In step S510, the capturing unit 10 captures fingerprints of a user. In step S520, the image generating module 310 performs an image processing function for the captured fingerprints and generates an image of the capture fingerprints formed by a number of ridges. In step S530, the scanning module 320 scans the image of the capture fingerprints according to a scanning frequency and selects a number of scanning lines. In step S540, the point acquiring module 330 acquires a cross point formed between each ridge of fingerprint and each scanning line. In step S550, the slope value calculating module 340 acquires a tangent line which is tangent with one ridge of fingerprint associated with each cross point and calculates a slope value according to a gradient of the tangent line relative to the corresponding scanning line. In step S560, the graph generating module 350 generates a graph between each cross point and each corresponding slope value.

In step S570, the determination module 360 determines whether the generated graph is similar to the at least one graph from the storage unit 20 to obtain a determination result. In step S580, if the determination module 360 determines that the generated graph is similar to one of the at least one graph from the storage unit 20, the output control module 370 outputs a passing recognition result of the fingerprints of the user. In step S590, if the determination module 360 determines that the generated graph is not similar to the at least one graph from the storage unit 20, the output control module 370 outputs a failing recognition result of the fingerprints of the user.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A fingerprint recognition apparatus comprising:
   a fingerprint obtaining unit to obtain fingerprints of a user;
   a storage unit to store at least one graph of fingerprints; and
   a control unit, comprising:
      an image generating module to perform an image processing function for the obtained fingerprints and generate an image of the obtained fingerprints formed by a plurality of ridges;
      a scanning module to scan the image of the obtained fingerprints according to a scanning frequency and select a plurality of scanning lines along a scanning direction;
      a point acquiring module to acquire a cross point formed between each ridge of fingerprint and each scanning line;
      a slope value calculating module to acquire a tangent line which is tangent with one ridge of fingerprint associated with each cross point and calculate a slope value according to a gradient of the tangent line relative to the corresponding scanning line;
      a graph generating module to generate a graph between each cross point and each corresponding slope value in a predetermined order of the cross points;
      a determination module to determine whether the generated graph from the graph generating module is similar to one of the at least one graph which was created in the same as the generated graph from the storage unit to obtain a determination result; and
      an output control module to output a recognition result of the fingerprints of the user associated with the determination result from the determination module.

2. The fingerprint recognition apparatus as recited in claim 1, wherein when the determination module determines that the generated graph is similar to one of the at least one graph from the storage unit, the output control module outputs a passing recognition result of the fingerprints of the user; and when the determination module determines that the generated graph is not similar to the at least one graph from the storage unit, the output control module outputs a failing recognition result of the fingerprints of the user.

3. The fingerprint recognition apparatus as recited in claim 1, wherein the determination module determines whether the at least one graph from the storage unit exists one which has the same number of cross points on each scanning line as the generated graph and created in the same order of cross points, when there is no graph which has the same number of cross points on each scanning line as the generated graph and created in the same order of cross points in the storage unit, the determination module determines that the generated graph is not similar to the at least one graph from the storage unit; when there is a graph which has the same number of cross points on each scanning line as the generated graph and created in the same order of cross points in the storage unit, the determination module further determines whether a difference of two slope values associated with each cross point between the generated graph and the stored graph is within a predetermined range and acquires the number of the differences of each two slope values within the predetermined range, and determines whether a percentage of the number of the differences of each two slope values within the predetermined range is greater than a predefined value, when the percentage of the number of the differences of each two slope values within the predetermined range is greater than the predefined value, the determination module determines that the generated graph is similar to one of the at least one graph from the storage unit, and when the percentage of the number of the differences of each two slope values within the predetermined range is less than the predefined value, the determination module determines that the generated graph is not similar to the at least one graph from the storage unit.

4. The fingerprint recognition apparatus as recited in claim 1, wherein the graph generated from the graph generating module is discrete.

5. The fingerprint recognition apparatus as recited in claim 1, wherein the slope value of each cross point is direct ratio to the gradient of the corresponding tangent line.

6. A fingerprint recognition method adapted for a fingerprint recognition apparatus, wherein the apparatus stores at least one graph of fingerprints, the method comprising:
   obtaining fingerprints of a user;
   performing an image processing function for the obtained fingerprints and generating an image of the obtained fingerprints formed by a plurality of ridges;
   scanning the image of the obtained fingerprints according to a scanning frequency and selecting a plurality of scanning lines along a scanning direction;
   acquiring a cross point formed between each ridge of fingerprint and each scanning line;
   acquiring a tangent line which is tangent with one ridge of fingerprint associated with each cross point and calculate a slope value according to a gradient of the tangent line relative to the corresponding scanning line;
   generating a graph between each cross point and each corresponding slope value in a predetermined order of the cross points;

determining whether the generated graph is similar to one of the stored at least one graph which was created in the same as the generated graph to obtain a determination result; and outputting a recognition result of the fingerprints of the user associated with the determination result.

7. The fingerprint recognition method as recited in claim 6, the step of "outputting a recognition result of the fingerprints of the user associated with the determination result" comprising:

if the generated graph is similar to one of the stored at least one graph, outputting a passing recognition result of the fingerprints of the user; and if the generated graph is not similar to the stored at least one graph, outputting a failing recognition result of the fingerprints of the user.

8. The fingerprint recognition method as recited in claim 6, the step of "determining whether the generated graph is similar to the stored at least one graph to obtain a determination result" comprising:

determining whether the stored at least one graph exists one which has the same number of cross points on each scanning line as the generated graph and created in the same order of cross points;

if there is no stored graph which has the same number of cross points on each scanning line as the generated graph and created in the same order of cross points, determining that the generated graph is not similar to the stored at least one graph;

if there is a stored graph which has the same number of cross points on each scanning line as the generated graph and created in the same order of cross points, determining whether a difference of two slope values associated with each cross point between the generated graph and the stored graph is within a predetermined range;

acquiring the number of the differences of each two slope values within the predetermined range, and determining whether a percentage of the number of the differences of each two slope values within the predetermined range is greater than a predefined value;

if the percentage of the number of the differences of each two slope values within the predetermined range is greater than the predefined value, determining that the generated graph is similar to one of the at least one graph from the storage unit; and if the percentage of the number of the differences of each two slope values within the predetermined range is less than the predefined value, determining that the generated graph is not similar to the stored at least one graph.

9. The fingerprint recognition method as recited in claim 6, wherein the generated graph is discrete.

10. The fingerprint recognition method as recited in claim 6, wherein the slope value of each cross point is direct ratio to the gradient of the corresponding tangent line.

* * * * *